United States Patent [19]

Lopez

[11] Patent Number: 4,981,955

[45] Date of Patent: Jan. 1, 1991

[54] DEPOLYMERIZATION METHOD OF HEPARIN

[76] Inventor: Lorenzo L. Lopez, C/ Ferraz, No. 42 - 1º Dcha, 28008 Madrid, Spain

[21] Appl. No.: 485,756

[22] Filed: Feb. 26, 1990

Related U.S. Application Data

[63] Continuation of Ser. No. 212,568, Jun. 28, 1988, abandoned.

[51] Int. Cl.[5] ...................... C08B 37/10; C07H 23/00; A61K 31/725; A61K 31/715

[52] U.S. Cl. .................................... 536/21; 536/55.3; 536/18.7; 536/121; 514/56; 514/54

[58] Field of Search ............... 536/21, 121, 18.7, 55.3; 514/56, 54

[56] References Cited

U.S. PATENT DOCUMENTS

| | | | |
|---|---|---|---|
| 4,440,926 | 4/1984 | Mardiguiam | 536/21 |
| 4,654,327 | 3/1987 | Teng | 536/21 |
| 4,736,024 | 4/1988 | Della Valle et al. | 536/18.7 |
| 4,745,105 | 5/1988 | Griffin | 536/21 |

*Primary Examiner*—Ronald W. Griffin
*Assistant Examiner*—Pamela S. Webber

[57] ABSTRACT

A method of depolymerizing heparin to obtain a heparin with low molecular weight provided with antithrombotic activity comprises treating a quarternary ammonium salt of heparin with a quarternary ammonium hydroxide.

19 Claims, No Drawings

DEPOLYMERIZATION METHOD OF HEPARIN

This is a continuation of application Ser. No. 212,568 filed on June 28, 1988, now abandoned.

This invention refers to a new depolymerization method of heparin. It consists particularly of preparing a heparin with low molecular weight, constituted by a mixture of heparin fragments with optimum composition, capable of selectively inhibiting some factors of coagulation. The invention also concerns the products resulting from applying the method.

Heparin is a sulphated mucopolysaccharide of animal origin, an extract from the intestine or lungs of mammals (cow, lamb, pig) and used for some considerable time in human therapeutics for the prevention and treatment of thromboembolic diseases.

It is known that the use of heparin is accompanied by very unpleasant hemorrhagic effects and that daily administration, three subcutaneous or intravenous injections, constitutes a considerable drawback.

It is currently admitted that the antithrombotic activity of heparin is due mainly to its capacity of activating Antithrombin-III, plasma protein, and powerful inhibitor of the activated X factor and of thrombin. Hence, it is possible to measure the antithrombotic activity of heparin through specific tests of the inhibition of these factors.

It is also known that heparin currently used therapeutically are heterogeneous mixtures of diversely sulphated polysaccharide chains, variable in length, constituted by the linking of units of glucosamin and iduronic or glucuronic acids. The average molecular weight of these heparins varies between 12,000 and 18,000 daltons and the extreme values of the short and long chains range between 3,000 and 40,000 daltons.

Research conducted by different authors in recent years shows that the heparin fractions constituted by short chains and average molecular weight between 4,000 and 6,000 daltons, have a selective action on the $X_a$ factor, and have little effect on overall coagulation measured with pharmacopoeia methods. Furthermore, it has been found that these fractions of low molecular weight administered subcutaneously have a much more lasting action than heparin, and which is translated by long duration plasmatic activity, measured by an anti-$X_a$ factor activity test.

On the other hand, it has been proved that these fractions produce a much lower hemorrhagic effect than heparin. These experimental results have been confirmed by numerous clinical tests which have shown that low molecular weight heparins are efficient in the prevention of post-operatory thrombosis when around 20 to 40 mg. are administered per day, and which induce less hemorrhagic effects than conventional heparin.

For some time it has been known that fractions of low molecular weight heparin can be obtained by filtration on Sephadex gel or Bio-gel of a commercial heparin. Preparation by enzymatic hydrolysis is also known, in a heparinase medium, of the depolymerization products of heparin with an average molecular weight of 4,500 to 5,300 daltons and with an anticoagulating activity of approximately 70 U.S.P. units.

Over the last few years, various chemical methods have been used for depolymerizing heparin: treatment with sodium nitrite in an acid medium, alkaline treatment of esters, using free radicals generated in the presence of hydrogen peroxide. These methods enable mixtures of heparin fragments to be obtained, with variable yields, in which the average molecular weight and the anticoagulating activity vary according to the method and the conditions of the operation.

The studies carried out by the applicant have led to the perfecting of a new method for the controlled depolymerization of heparin.

The process consists of treating a quaternary ammonium salt of heparin in a suitable solvent, with a quaternary ammonium hydroxide. The reaction can be conducted at room temperature or at a higher temperature. The quaternary ammonium salt of heparin is obtained by complete salification of the sulphate, sulphamate and carboxylate groups of the heparin by a quaternary ammonium.

Quaternary ammonium hydroxide can be a commercial product, like benzyltrimethylammonium hydroxide (Triton B), or any other hydroxide in an alcoholic solution, such as methanol, ethanol or isopropanol. This hydroxide can be easily obtained from a quaternary ammonium halogen by an exchange reaction on an ion exchanger. Between the quaternary ammonium salts of heparin, it is preferable to use long-chain ammonium salts, such as citylpyridinium, dodecyldimethylammonium, benzetonium . . . .

The solvents preferably used in the depolymerization reaction are dichloromethane, formamide, dimethylformamide or any other solvent which is unhydroxylated polar.

The operation conditions, especially the temperature, duration of the reaction, and amount of hydroxide enable the desired degree of depolymerization to be obtained.

After the reaction, the products obtained from the precipitation are isolated, through an alcoholic solution of an alkali or alkaline earth salt. The products obtained can also be fractioned by normal fractioned precipitation, ultrafiltration or chromatography methods.

The new method differs from other chemical methods known until now in that it takes place in a non-aqueous medium, in an inert solvent and in conditions which can be extremely gentle. One of the advantages of the method is that it does not degrade the active place of the heparin molecule and does not provoke a secondary desulphuration reaction.

Another advantage is that the heparin fragments with low molecular weight which have no biological activity, are automatically eliminated in the final precipitation stage, so that the product obtained has an optimum composition, regulated by operating conditions, according to the average molecular weight wanted.

Furthermore, the main reagent of the reaction, i.e., the quaternary ammonium hydroxide does not precipitate and does not stain the final product.

The oligosaccharide mixtures obtained according to the method defended can be fractioned by known methods: fractioned precipitation, chromatography, ultrafiltration.

It is also very advantageous to subject these products to the gentle action of a reducing agent such as sodium or potassium borohydride, to stabilize the terminal groups.

The compositions resulting from applying the method defended can be obtained from heparins of different origins (cow, pig, lamb), or normal quality or with particular characteristics, such as a specific activity over 220 U.S.P. units. The average molecular weight of these heparins can vary between 10,000 and 20,000 daltons.

These compositions are made up of oligosaccharides in which the molecular weight varies between 1,200 and 15,000 daltons. Compositions used for the prevention and treatment of thromboembolic diseases will have an average molecular weight between 2,500 and 5,500 daltons preferably. These products may be administered in the form of pharmaceutically acceptable salts, such as sodium, calcium or magnesium salt.

The daily dose used in the prevention of post-operatory thrombosis will be around 20 to 60 mg., with a rate of one subcutaneous administration per day.

The products can also be used in the treatment of hyperlipemias and as anti-inflammatory agents.

The examples attached which illustrate the invention, do not limit its scope in the least.

ILLUSTRATIVE EXAMPLES

EXAMPLE 1

10 gr. of benzetonium heparinate are dissolved in 50 ml. of dichloromethane and 2 ml. of a 40% solution of benzyltrimethylammonium hydroxide (Triton B) are added to the methanol. The solution is allowed to settle for 24 hours at room temperature and then 2 ml. of Triton B solution are added. After setting for 24 hours, 50 ml. of a 10% sodium acetate solution in methanol are added. The precipitate is collected by filtration, washed with methanol and dried. 2.9 gr. of depolymerized heparin are obtained.

EXAMPLE 2

10 gr. of benzetonium heparinate are dissolved in 50 ml. of dichloromethane and 2 ml. of a 40% Triton B solution in methanol are added. This solution is boiled for 6 hours and left to settle at room temperature. It is precipitated adding 50 ml. of a 10% sodium acetate solution in methanol. The precipitate is isolated by filtration, washed with methanol and vacuum dried, yielding 2.5 gr. of depolymerized heparin.

EXAMPLE 3

A solution of 10 gr. of benzetonium heparinate in 50 ml. of dichloromethane is combined with 2 ml. of a 40% solution of Triton B in methanol for 24 hours at 30° C. Then a further 2 m.l of Triton B solution are added, and left to settle for 24 hours at 30° C. The same operation is performed again and then 50 ml. of a 10% calcium acetate solution are added. The precipitate is collected by filtration, washed with methanol and dissolved in 50 ml. of water. 10 ml. of a 5% sodium borohydride solution are added and left at room temperature for 24 hours. The solution is filtered, 6 gr. of filtered calcium chloride are added and precipitated, followed by adding 200 ml. of methanol. It is isolated by filtration, washed with methanol and vacuum dried, yielding 2.5 gr. of depolymerized heparin in the form of calcium salt. In these examples, the benzetonium heparinate used was prepared from a pig heparin, whose activity is 165 U.S.P. units.

Analysis of the Products

The products are usually analyzed according to heparin analysis techniques. Nevertheless, and due to its low molecular weight, particular characteristics are involved which will be mentioned in the illustrative examples. The average molecular weight has been measured by gel-chromatography, as per the method of E. A. JOHNSON et al. (Carbohydrate Research, 51, 119-127, 1176).

The anti-Xa factor activity has been determined in human plasma according to the amidolytic method described by TEIEN et al. (Thrombosis Research, 8,413,1976), using the reagents contained in the kit marketed by the KABI. Activity is expressed in units/mg., taking as reference the 4th International Heparin Meeting which attributed to it a titer of 177 U/mg. The overall anticoagulating activity is expressed in U.S.P. units and measured in the same way as for heparin.

Other characteristics, rotary power and sulphur and nitrogen content, are determined according to methods of the United States Pharmacopoeia U.S.P. XIX. The following results are given simply for information and do not limit the scope of this invention.

| | Example I | Example 2 | Example 3 |
|---|---|---|---|
| Average molecular weight (daltons) | 6,000 | 5,000 | 4,600 |
| Rotary power | +41° | +40.5° | +40° |
| Sulphur content | 11.5 | 11.6 | 11.5 |
| Nitrogen content | 2.1 | 2.05 | 2.2 |
| Anit-$X_a$ activity | 140 | 125 | 103 |
| Anticoagulating activity U.S.P. | 65 | 55 | 50 |
| Calcium content | — | — | 9.8 |

Pharmacological Activity

The antithrombotic activity of the products has been determined in animals on a venous thrombosis model, according to the REYERS method (Thrombosis Research, 18, 669-674, 1980). The experimental model consists of measuring the protective effect of a product on the formation of a thrombus induced by ligature of the vena cava of a rat. Doses of 0 to 1 mg/kg. are used by intravenous administration 10 min. before the ligature. The efficiency of a product is expressed by its $DE_{50}$, deduced from the curve which represents the variation in the weight of the trunk according to the dose.

The following results weere obtained:

| | $DE_{50}$ (mg/Kg) |
|---|---|
| Product in Example 1 | 0.20 |
| Product in Example 2 | 0.35 |
| Product in Example 3 | 0.30 |

It was therefore found that the products of the invention exercise important antithrombotic activity.

Duration of the Action

Both the products and commercial heparin were administered subcutaneously in primates with a dose of 1 mg/kg., and blood was taken over 24 hours. In the plasma, the anti-$S_a$ activity was measured, using the indications and reagents of thhe KABI bit. The following results correspond to the product in Example 3 and to the heparin. They show the average of five animals.

| | Anti-$X_a$ activity | |
|---|---|---|
| Time | Heparin | Product in Example 3 |
| 0 | 0 | 0 |
| 3 h. | 20 | 70 |

-continued

| Time | Anti-$X_a$ activity | |
|---|---|---|
| | Heparin | Product in Example 3 |
| 6 h. | 5 | 60 |
| 9 h. | 0 | 45 |
| 12 h. | — | 20 |
| 24 h. | — | 10 |

Hence, we can see that the duration of the action of the product in the 3rd example is much longer than that of Heparin and lasts up to 24 hours.

Toxicity

Acute toxicity of the products was measured in the rat. The lethal dose $LD_{50}$ administered intravenously is over 1,600 mg/Kg.

I claim:

1. A method of depolymerizing heparin to obtain a heparin having a low molecular weight provided with antithrombotic activity comprising contacting a fully salified quaternary ammonium salt of heparin with a quaternary ammonium hydroxide in a non-aqueous polar solvent for a time sufficient to degrade the heparin into a low molecular weight product provided with long duration antithrombotic activity, contacting the degraded heparin with a sodium, calcium or magnesium salt and thereafter isolating the low molecular weight heparin in the form of the resulting sodium, calcium or magnesium salt thereof.

2. A method of depolymerizing heparin according to claim 1 wherein the contacting is effected at a temperature between 10° and 60° C.

3. A method of depolymerizing heparin according to claim 2 in which the contacting is continued until the low molecular weight heparin product resulting from the depolymerization has an average molecular weight between 2500 and 6000 daltons.

4. A method of depolymerizing heparin according to claim 3 in which the sodium, calcium or magnesium salt of heparin is contacted with a reducing agent.

5. A method of depolymerizing heparin according to claim 4 in which the reducing agent is sodium borohydride.

6. A method of depolymerizing heparin according to claim 2 in which the sodium, calcium or magnesium salt of heparin is contacted with a reducing agent.

7. A method of depolymerizing heparin according to claim 6 in which the reducing agent is sodium borohydride.

8. A method of depolymerizing heparin according to claim 1 in which the contacting is continued until the low molecular weight heparin product resulting from the depolymerization has an average molecular weight between 2500 and 6000 daltons.

9. A method of depolymerizing heparin according to claim 8 in which the sodium, calcium or magnesium salt of heparin is contacted with a reducing agent.

10. A method of depolymerizing heparin according to claim 9 in which the reducing agent is sodium borohydride.

11. A method of depolymerizing heparin according to claim 1 in which the quaternary ammonium salt of heparin is benzetonium heparinate.

12. A method of depolymerizing heparin according to claim 11 in which the ammonium hydroxide is benzyltrimethylammonium hydroxide.

13. A method of depolymerizing heparin according to claim 12 wherein the contacting is effected at a temperature between 10° and 60° C.

14. A method of depolymerizing heparin according to claim 13 in which the contacting is continued until the low molecular weight heparin product resulting from the depolymerization has an average molecular weight between 2500 and 6000 daltons.

15. A method of depolymerizing heparin according to claim 14 in which the sodium, calcium or magnesium salt is of heparin contacted with a reducing agent.

16. A method of depolymerizing heparin according to claim 15 in which the reducing agent is sodium borohydride.

17. The method of depolymerizing heparin according to claim 1 in which the ammonium hydroxide is benzyltrimethylammonium hydroxide.

18. The method of depolymerizing heparin according to claim 17 in which the solvent is dichloromethane.

19. The method of depolymerizing heparin according to claim 1 in which the solvent is dichloromethane.

* * * * *

UNITED STATES PATENT AND TRADEMARK OFFICE

CERTIFICATE OF CORRECTION

PATENT NO. : 4,981,955

DATED : January 1, 1991

INVENTOR(S) : Lorenzo L. Lopez

It is certified that error appears in the above-identified patent and that said Letters Patent is hereby corrected as shown below:

On the title page;

--[73] Assignee: Laboratorios Farmaceuticos Rovi S.A., Spain--

Signed and Sealed this

Seventh Day of July, 1992

*Attest:*

DOUGLAS B. COMER

*Attesting Officer*

*Acting Commissioner of Patents and Trademarks*